United States Patent
Maeda

(10) Patent No.: US 6,651,150 B2
(45) Date of Patent: Nov. 18, 2003

(54) DATA-PROCESSING APPARATUS AND METHOD OF CONTROLLING THE REWRITING OF A NONVOLATILE STORAGE DEVICE

(75) Inventor: Mayumi Maeda, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 183 days.

(21) Appl. No.: 09/887,101

(22) Filed: Jun. 25, 2001

(65) Prior Publication Data

US 2001/0056518 A1 Dec. 27, 2001

(30) Foreign Application Priority Data

Jun. 27, 2000 (JP) ......................... 2000-192757

(51) Int. Cl.7 ........................... G06F 12/08; G06F 12/14
(52) U.S. Cl. ........................................ 711/163; 711/103
(58) Field of Search ................................ 711/163, 103, 711/164

(56) References Cited

U.S. PATENT DOCUMENTS 6,078,520 A * 6/2000 Tobita et al. ........... 365/185.09
6,148,384 A * 11/2000 Devanagundy et al. ..... 711/163
2002/0002613 A1 * 1/2002 Freeman et al. ............ 709/225
2003/0056070 A1 * 3/2003 Dayan et al. ............... 711/163

FOREIGN PATENT DOCUMENTS

EP    0 967 551 A2    12/1999

* cited by examiner

Primary Examiner—Kevin L. Ellis
Assistant Examiner—Midys Inoa
(74) Attorney, Agent, or Firm—Finnegan, Henderson, Farabow, Garrett & Dunner, L.L.P.

(57) ABSTRACT

In a computer, software may make an access to a controller in order to rewrite the contents of a nonvolatile storage device. If so, an interruption signal is automatically supplied to a CPU. In response to the interruption signal the CPU stops executing the software and starts performing an interruption process. During the interruption process it is determined whether the access made by the software is a right one. If the access is a wrong one, the rewriting of the contents of the nonvolatile storage device is prohibited at once.

28 Claims, 5 Drawing Sheets

DATA-PROCESSING APPARATUS AND METHOD OF CONTROLLING THE REWRITING OF A NONVOLATILE STORAGE DEVICE

CROSS-REFERENCE TO RELATED APPLICATIONS

This application is based upon and claims the benefit of priority from the prior Japanese Patent Application No. 2000-192757, filed Jun. 27, 2000, the entire contents of which are incorporated herein by reference.

BACKGROUND OF THE INVENTION

1. Field of the Invention

The invention relates to a data-processing apparatus, such as a personal computer, which has a nonvolatile storage device, and to a method of controlling the rewriting of the nonvolatile storage device incorporated in a data-processing apparatus.

2. Description of the Related Art

In recent years, various portable, battery-driven notebook-type personal computers have been developed. Each notebook-type personal computer incorporates an electrically programmable nonvolatile storage device such as a flash memory. The nonvolatile storage device stores a BIOS (Basic Input/Output System). It may be electrically programmed, whereby the BIOS is easily updated to new version.

It is usually necessary to use two items to update the BIOS in a personal computer. The first item is a new-version BIOS image file. The second item is a flexible disk (FD) that stores a BIOS-updating system program. The flexible disk is inserted into the personal computer. The computer is then powered on. The computer is thereby booted up from the flexible disk and starts executing the BIOS-updating system program. The BIOS-updating system program rewrites the nonvolatile storage device in the format of the new-version BIOS image file. Thus, the BIOS is updated to the new version.

Recently, it has been proposed that the BIOS be updated from application software that operates on an operating system (OS). In this BIOS-updating method, it is unnecessary to boot up the system from a flexible disk. Hence, the BIOS can be easily updated, even in so-called "FDD-less personal computers" that do not incorporate a flexible disk drive (FDD). The procedure of rewriting the nonvolatile storage device to update the BIOS varies in accordance with the platform of the personal computer. But most of rewriting procedures are disclosed. Hence, any person can easily rewrite a nonvolatile storage device, only if he or she prepares application software that performs the procedure of rewriting the nonvolatile storage device.

A person may prepare, in bad faith, software (i.e., virus) for corrupting BIOS and may distribute it to personal computers through a network such as the Internet. In this case, the BIOS in any personal computer that executes this software will be destroyed.

BRIEF SUMMARY OF THE INVENTION

An object of the present invention is to provide a data-processing apparatus in which a nonvolatile storage device is protected from wrong rewriting of its contents which therefore has a high security level.

Another object of the present invention is to provide a method of controlling the rewriting the nonvolatile storage device incorporated in a data-processing apparatus.

To attain the objects, a data-processing apparatus according to the present invention comprises: a nonvolatile storage device; a controller configured to rewrite the contents of the nonvolatile storage device; means for accessing the controller to rewrite the contents of the nonvolatile storage device; means for determining whether the access made by the accessing means is a right one or not; and means for prohibiting the controller from rewriting the contents of the nonvolatile storage device when the determining means determines that the access made by the accessing means is a not right one.

In the data-processing apparatus, the accessing means may make an access to the controller to rewrite the contents of the nonvolatile storage device. When the accessing means makes such an access, it is determined whether the access is a right one or not. If the access is a not right one, the rewriting of the contents of the nonvolatile storage device is prohibited at once. Hence, the security level of the apparatus can be increased.

Preferably, the data-processing apparatus further comprises a CPU; and an interruption signal generator configured to generate an interruption signal to the CPU when the accessing means accesses the controller. The determining means is activated by the CPU when the CPU receives the interruption signal.

Preferably, the data-processing apparatus further comprises signal-masking prohibiting circuit that prohibits masking of the interruption signal.

To prevent an accidental rewriting of the contents of the nonvolatile storage device, it is desirable that the controller should have a write-protecting function for protecting the contents of the nonvolatile storage device from the accidental rewriting. Then, the interruption signal generator generates the interruption signal when the software releases the write-protecting function of the controller by accessing to the controller. If the access is a wrong one, the write-protecting function is returned active state, thereby to prohibit wrong rewriting of the contents of the nonvolatile storage device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given below and the detailed description of the preferred embodiment given below, serve to explain the principles of the invention.

DETAILED DESCRIPTION OF THE INVENTION

An embodiment of the present invention will be described, with reference to the accompanying drawings.

Figure 1:
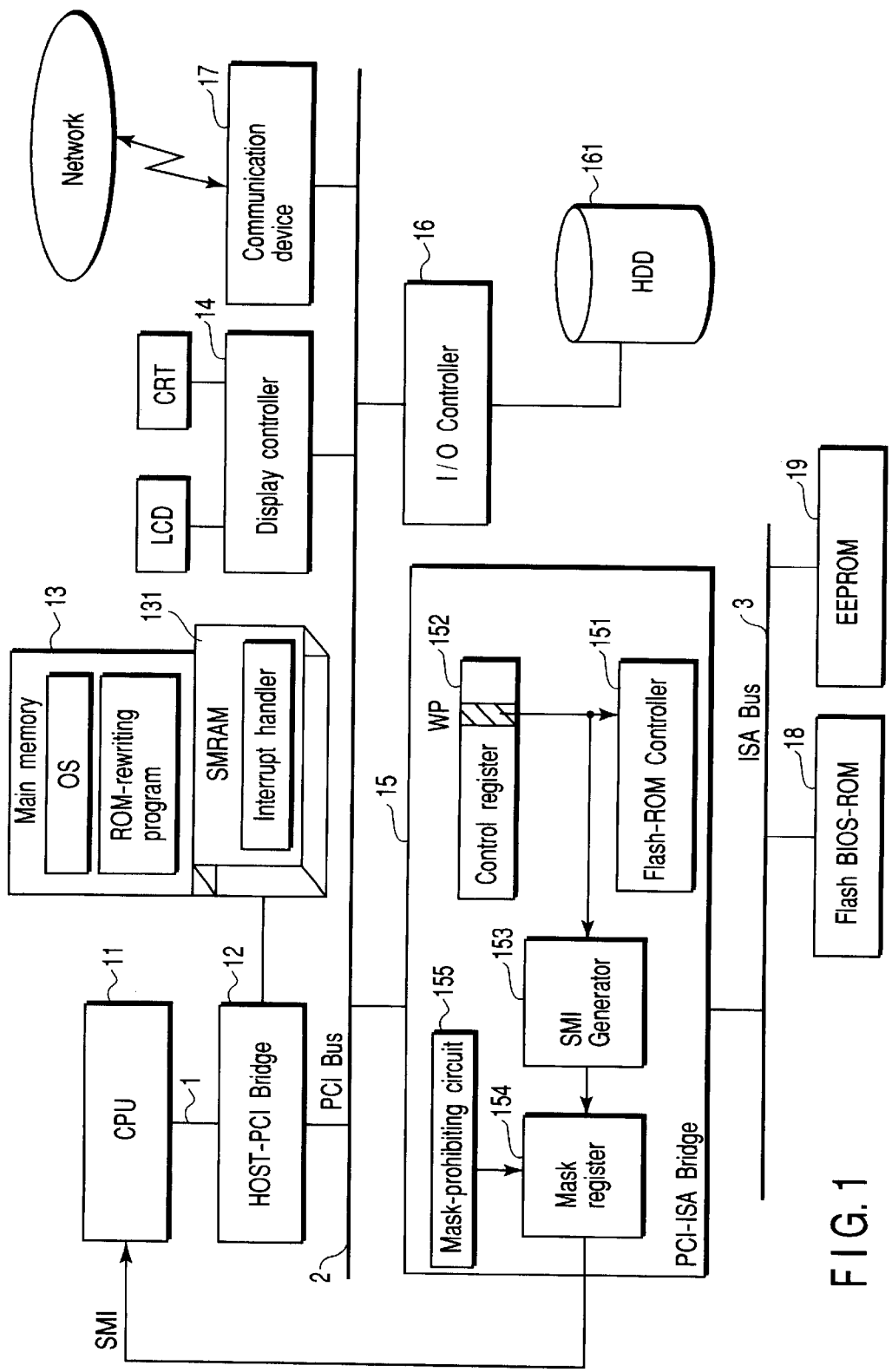
FIG. 1 is a block diagram showing a computer system according to an embodiment of the present invention.

FIG. 1 shows a computer system that is an embodiment of the present invention. The system is a notebook-type personal computer that can be driven by a battery. The computer comprises a processor bus 1, a PCI bus 2, an ISA bus 3, a CPU 11, a host-PCI bridge 12, a main memory 13, a display controller 14, a PCI-ISA bridge 15, an I/O controller 16, a communication device 17, a flash BIOS-ROM 18 and an EEPROM 19.

The CPU (Central processing unit) 11 controls some of the other components of the computer. It executes the operating system (OS), the ROM-rewriting program and the like, which are loaded in the main memory 13. The ROM-rewriting program is software designed to rewrite the flash BIOS-ROM 18. It is an application program that can work while the CPU 11 is executed the OS. While executing the OS, the CPU 11 may execute the ROM-rewriting program to update the BIOS stored in the flash BIOS-ROM 18.

The CPU 11 is a processor that supports a system management Interrupt (SMI). In other words, the CPU 11 can operate in an operating mode called "system management mode, SMM," as well as in the ordinary operating mode to execute the OS and applications.

When the CPU 11 receives a system management interrupt (SMI) signal, the operating mode of the CPU 11 is switched from the ordinary mode (i.e., real mode, protect mode or virtual 86 mode) to SMM. In other words, the computer system interrupts the normal program execution and invokes SMM by generating SMI signal to CPU11. In SMM, the CPU 11 executes the system management program stored in the SMRAM 131 that is provided in the computer. The system management program, used as SMM-BIOS, has been copied from the flash BIOS-ROM 18 into the SMRAM 131. The SMRAM 131 stores an interruption handler that is a system management program designed to prevent wrong ROM-rewriting. The interruption handler is an interruption program the CPU 11 executes when its operating mode of the CPU 11 is switched to SMM.

As shown in FIG. 1, the PCI-ISA bridge 15 comprises a hardware logic that is indispensable to the rewriting of the flash BIOS-ROM 18. When the hardware logic is accessed by software, a system management Interrupt (SMI) is supplied to the CPU 11. Upon receipt of the SMI the CPU 11 stops executing the software. The interruption handler stored in the SMRAM 131 is called. Note that the interruption handler is protected and cannot be rewritten.

The host-PCI bridge 12 is a bridge device that connects the processor bus 1 and the PCI bus 2, which interact with each other. The bridge 12 incorporates a memory control function for controlling the access to the main memory 13. The display controller 14 controls an LCD or an external CRT used as the display monitor of the computer.

The PCI-ISA bridge 15 is a bridge device that connects the PCI bus 2 and the ISA bus 3 and can functions as the bus master to the PCI bus 2. The bridge 15 includes a circuit that operates to rewrite the flash BIOS-ROM 18 and a circuit that generates an SMI signal.

As shown in FIG. 1, the PCI-ISA bridge 15 comprises a flash ROM controller 151, a control register 152, an SMI generator 153, a mask register 154, and a mask-prohibiting circuit 155. The flash ROM controller 151 controls the flash BIOS-ROM 18 in accordance with various commands set in the control register 152. Data is thereby written into, read from, and eased in, the flash BIOS-ROM 18. To rewrite the contents of the flash BIOS-ROM 18, the contents are erased, and necessary program images are written into the flash BIOS-ROM 18.

The control register 152 stores a write-protecting bit WP. The write-protecting bit WP allows or prohibits the erase/write control of the flash BIOS-ROM 18, which the flash ROM controller 151 may perform. Usually the bit WP is set at "0," protecting the flash ROM controller 151 from erasing data in, or writing data into, the flash BIOS-ROM 18. The procedure of rewriting the flash BIOS-ROM 18, performed in accordance with the ROM-rewriting program, includes a process of releasing the write protect of the flash ROM controller 151 by changing the write-protecting bit WP to "1."

The SMI generator 153 generates an SMI signal when the write-protecting bit WP rewritten to "1." The SMI generator 153 is connected to the control register 152 and is triggered when the bit WP changes from "0" to "1," generating an SMI signal. The SMI signal is supplied to the CPU 11.

Like the control register 152, the mask register 154 is an I/O register from which the CPU 11 can read data and into which the CPU 11 can write data. The mask-prohibiting circuit 155 is provided to prohibit the masking of the SMI signal. Once the circuit 155 is activated by software, mask data for prohibiting the generation of SMI signals can no longer be written into the mask generator 154, thereby the masking of the SMI signal is prohibited.

The I/O controller 16 incorporates a bus-master IDE controller that controls an HDD 161 incorporated in the computer and used as an IDE device. The bus-master IDE controller can function as a bus master to transfer data between the HDD 161 and the main memory 13.

The communication device 17 is designed to accomplish communication between the computer and any other computer via a network. The communication device 17 may be a MODEM, a LAN card or the like. The device 17 may be used to update the BIOS. More precisely, the device 17 may downloads the new-version BIOS image file and the ROM-rewriting program from a WEB server or the like that is provided on the network. The BIOS image file and the ROM-rewriting program downloaded are stored into the HDD 161.

As indicated above, the flash BIOS-ROM 18 is provided to store the system BIOS. It is a flash memory (known as "flash EEPROM") that is an electrically programmable nonvolatile memory. Thus, in the flash BIOS-ROM 18, the BIOS can be rewritten by the use of software. The system BIOS is a systemized combination of a POST (Power-On Self Test) routine, device drivers for controlling various I/O devices, a BIOS setup routine for setting a system environment, and the like. The system BIOS is used to control the hardware items provided in the computer. The flash BIOS-ROM 18 contains the above-mentioned SMM-BIOS, too.

The EEPROM 19 stores information such as passwords, which is necessary for security management. Such information can be written into, read from, and erased in, the EEPROM 19, under the control of the flash ROM controller 151. That is, the controller 151 functions as a memory controller that controls accesses to the flash BIOS-ROM 18 and EEPROM 19.

Security Functions for Rewriting of the Flash ROM

The computer according to the present embodiment has the following five security functions concerning the rewriting of the flash ROM:
(1) To prohibit any inappropriate rewriting of the flash BIOS-ROM 18.
(2) To prohibit any masking of the interruption signal (SMI) generated in the procedure of rewriting the flash BIOS-ROM 18.
(3) To prohibit corrupting of the interruption handler.
(4) To prevent any person from disabling, in bad faith, the interruption handler from prohibiting rewriting of the flash BIOS-ROM 18.
(5) To allow an appropriate rewriting of the flash BIOS-ROM 18.

Rewriting of the Flash ROM, #1

Figure 2:
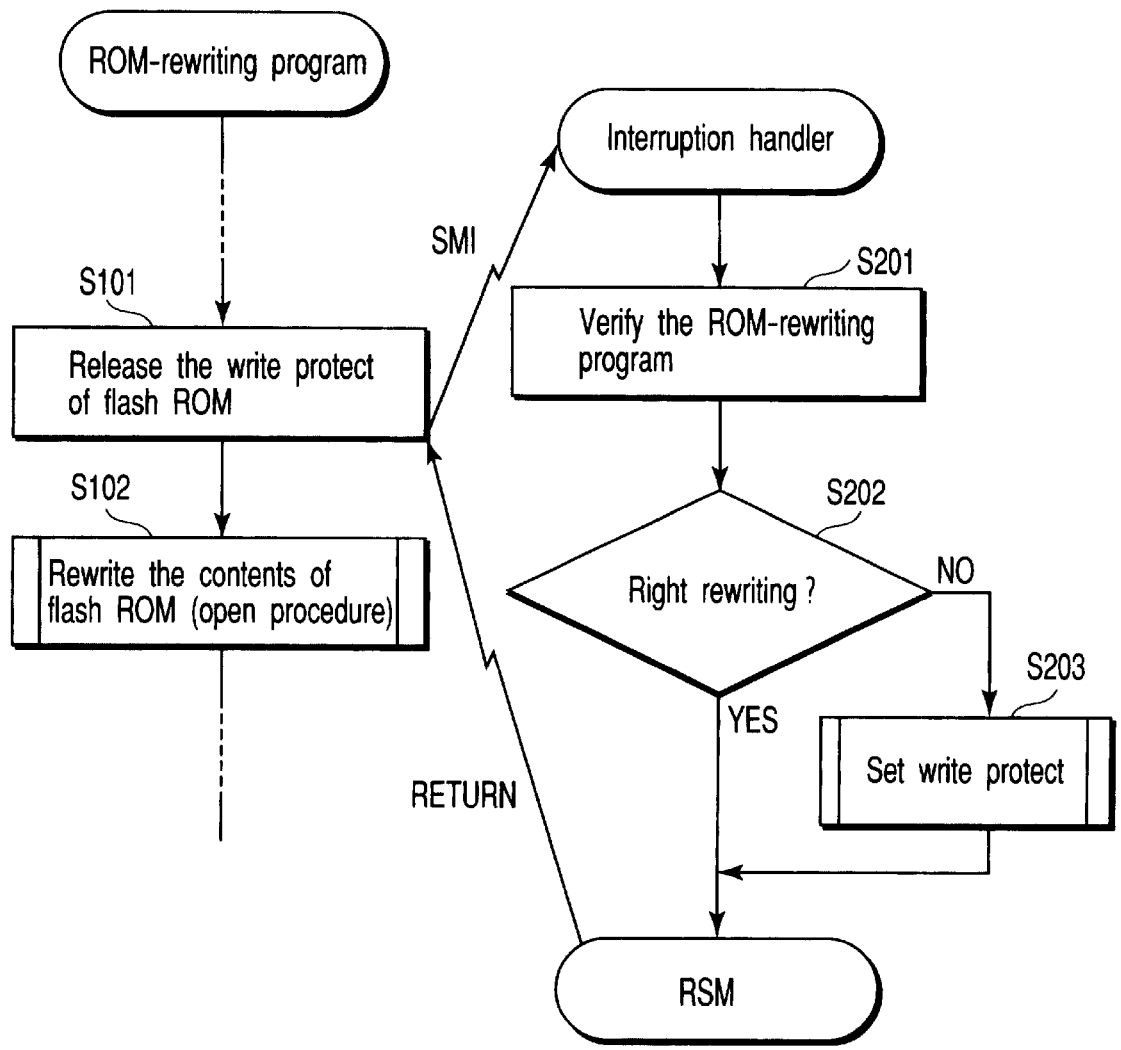
FIG. 2 is a flowchart explaining a method of rewriting the flash ROM incorporated in the system of FIG. 1.

A first procedure of rewriting the flash ROM will be described, with reference to the flowchart of FIG. 2.

The CPU 11 executes the ROM-rewriting program, performing a hardware access (I/O access), whereby the write-protecting bit WP is rewritten to "1" in the control register 152. The write-protecting function of the flash ROM controller 151 is thereby released (Step S101). When the hardware access is performed, the SMI generator 153 generates an SMI signal, which is supplied to the CPU 11. Upon receipt of the SMI signal the CPU 11 saves the context concerning the ROM-rewriting program in the SMRAM 131. Then, the operating mode of the CPU 11 is switched from the ordinary mode to SMM. The ROM-rewriting program is thereby interrupted. Now set in SMM, or the system management mode, the CPU 11 starts executing the interruption handler.

Executing the interruption handler, the CPU 11 performs program-authentication for verifying the interrupted ROM-rewriting program (Step S201). Then, the CPU 11 determines whether the hardware access it has made by executing the ROM-rewriting program is a right one or not (Step S202). To be more specific, the CPU 11 carries out any one of the following two operations:

(1) It checks the process name or the like of the program interrupted, i.e., the ROM-rewriting program, to determine whether the program has been distributed from the manufacturer of the computer. If the interrupted ROM-rewriting program has been distributed from the manufacturer of the computer, it is determined that the interrupted ROM-rewriting program is a right one, that is, the hardware access it has made by executing the ROM-rewriting program is a right one.

(2) It determines whether a special procedure not related to the rewriting procedure has been performed before the generation of the SMI signal. The special procedure is performed by the code embedded in the right ROM-rewriting program, before the hardware access to the flash ROM controller 151. The code is not disclosed, and is prepared for only right ROM-rewriting program. If the interrupted ROM-rewriting program has performed the special procedure, it is determined that the interrupted ROM-rewriting program is a right one, that is, the hardware access it has made by executing the ROM-rewriting program is a right one.

If YES in Step S202, that is, if the hardware access made by executing the ROM-rewriting program is a right one, the interruption handler executes a resume (RSM) command. The operating mode of the CPU 11 is thereby switched from the SMM back to the ordinary mode. Thus, the CPU 11 starts executing the interrupted ROM-rewriting program again.

Executing the ROM-rewriting program, the CPU 11 outputs a command to the flash ROM controller 151. In accordance with the command the controller 151 rewrites the contents of the flash BIOS-ROM 18 (Step S102). (More precisely, the controller 151 erases the BIOS in the flash BIOS-ROM 18 and writes new BIOS image into the flash BIOS-ROM 18.) The contents of the flash BIOS-ROM 18 are thereby updated as is desired.

If Step S202 it may be determined that the hardware access made by executing the ROM-rewriting program is a not right one. In this case, the interruption handler makes an access to the control register 152 and rewrites the write-protecting bit WP to "0." The write protect function of the controller 151 is thereby set again, and returned to its original active state (Step S203). Thereafter, the interruption handler executes the resume (RSM) command, switching the operating mode of the CPU 11 from the SMM to the ordinary mode. Thus, the CPU 11 starts executing the interrupted ROM-rewriting program again in order to rewrite the flash BIOS-ROM 18 (Step S102). However, the contents of the flash BIOS-ROM 18 are not erased. Nor is new BIOS written into the flash BIOS-ROM 18. This is because the write protect function of the controller 151 is activated, and the flash BIOS-ROM 18 is write-protected. Due to the interruption signal (SMI) generated and the interruption handler operating, the wrong ROM-rewriting program cannot rewrite the flash ROM as is intended, though it correctly performs the sequence of rewriting the flash ROM.

The ROM-rewriting program may release the write protect again. In this case, the interruption signal (SMI) is generated again, and the interruption handler sets the released write protect again to active the write protect function of the controller 151. The wrong ROM-rewriting program therefore fails to rewrite the flash ROM.

If the hardware access made by executing the ROM-rewriting program is a wrong one, not only the write protect is set again, but also an alarm is displayed on the display monitor, informing the computer user that a wrong ROM-rewriting program is being executed.

Rewriting of the Flash ROM, #2

Figure 3:
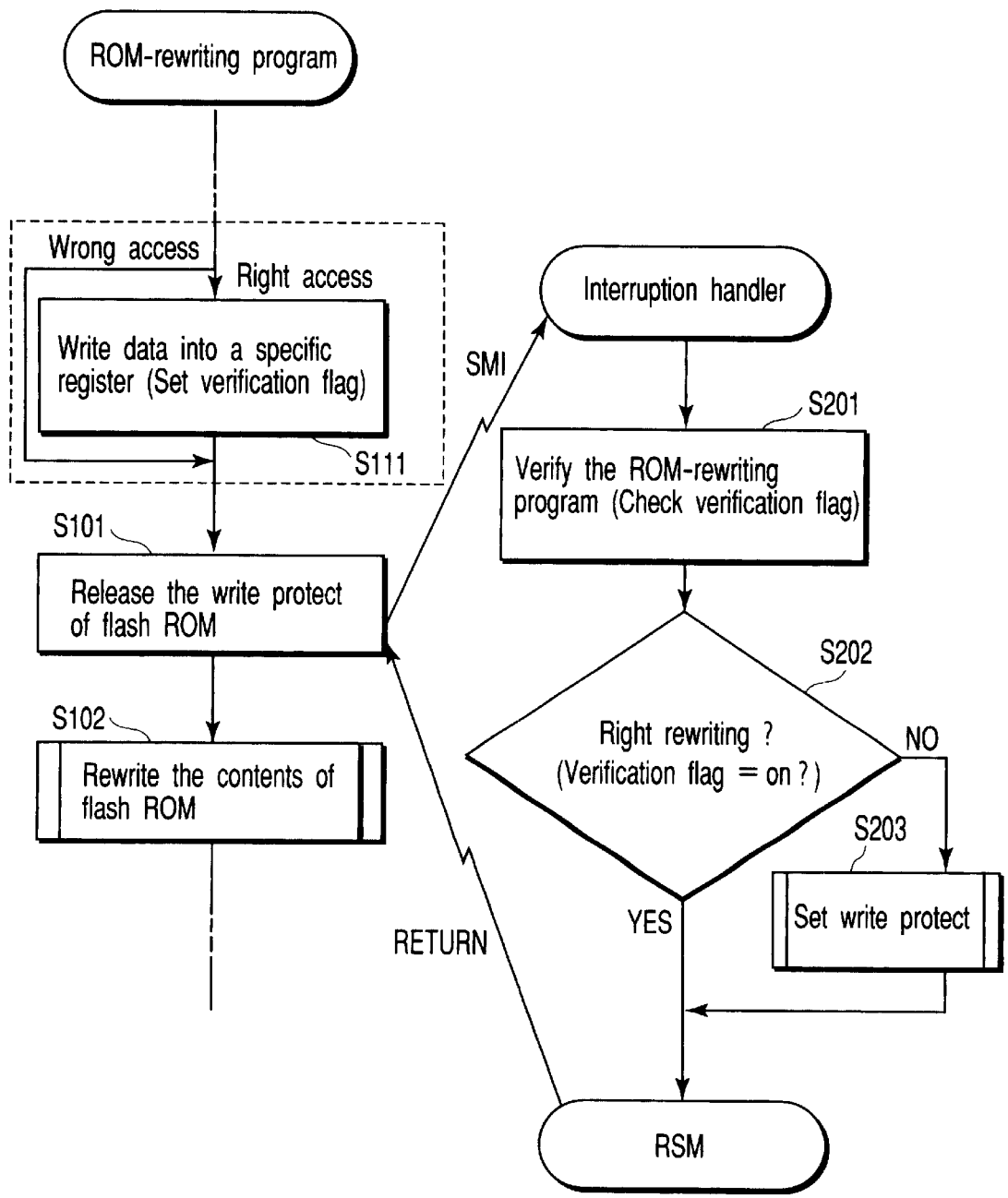
FIG. 3 is a flowchart explaining another method of rewriting the flash ROM incorporated in the system of FIG. 1.

A second procedure of rewriting the flash ROM will be described, with reference to the flowchart of FIG. 3. In the second procedure, the CPU 11 verifies the ROM-rewriting program in accordance with whether a write access has been made to a special I/O register that has been designated.

Any right ROM-rewriting program sets a prescribed bit (verification flag) in the special I/O register at "1" in Step S111 before releasing the write protect in Step S101. The register used for verifying the ROM-rewriting program characterizes the computer according to the invention. The I/O address of the register and the sequence of accessing the register are kept in secret. No wrong ROM-rewriting programs can set the prescribed bit in this register at "1." Therefore, a wrong ROM-rewriting program releases the write protect in Step S101 without setting the prescribed bit (verification flag).

When the write protect is released, the SMI generator 153 generates an SMI signal. The SMI signal is supplied to the CPU 11, whereby the operating mode of the CPU 11 is switched from the ordinary mode to SMM. Now set in SMM, the CPU 11 starts executing the interruption handler. That is, the CPU 11 checks the verification flag in order to verify the access to the flash ROM controller 151 that has been made in accordance with the ROM-rewriting program. Then, the CPU 11 determines whether this access is a right one or not (Step S202).

If the verification flag is set at "1," the CPU 11 determines that the access made in order to rewrite the flash BIOS-ROM 18 is a right one. The interruption handler executes the resume (RSM) command, switching the operating mode of the CPU 11 from the SMM to the ordinary mode. The CPU 11 therefore starts executing the interrupted ROM-rewriting program again. As a result, the contents of the flash BIOS-ROM 18 are erased and the new BIOS image is written into the BIOS-ROM 18 (Step S102). The contents of the flash BIOS-ROM 18 are thereby updated.

On the other hand, if the verification flag is set at "0," the CPU 11 determines that the access made in order to rewrite the flash BIOS-ROM 18 is a wrong one. In this case, the interruption handler makes an access to the control register 152 and rewrites the write-protecting bit WP to "0." The write protect is thereby set again for the flash BIOS-ROM 18 (Step S203). Thereafter, the interruption handler executes the resume (RSM) command, switching the operating mode of the CPU 11 from the SMM to the ordinary mode. The CPU 11 therefore starts executing the interrupted ROM-rewriting program again to rewrite the flash BIOS-ROM 18 (Step S102). However, the flash BIOS-ROM 18 cannot be rewritten because the flash BIOS-ROM 18 is write-protected.

Rewriting of the Flash ROM, #3

Figure 4:
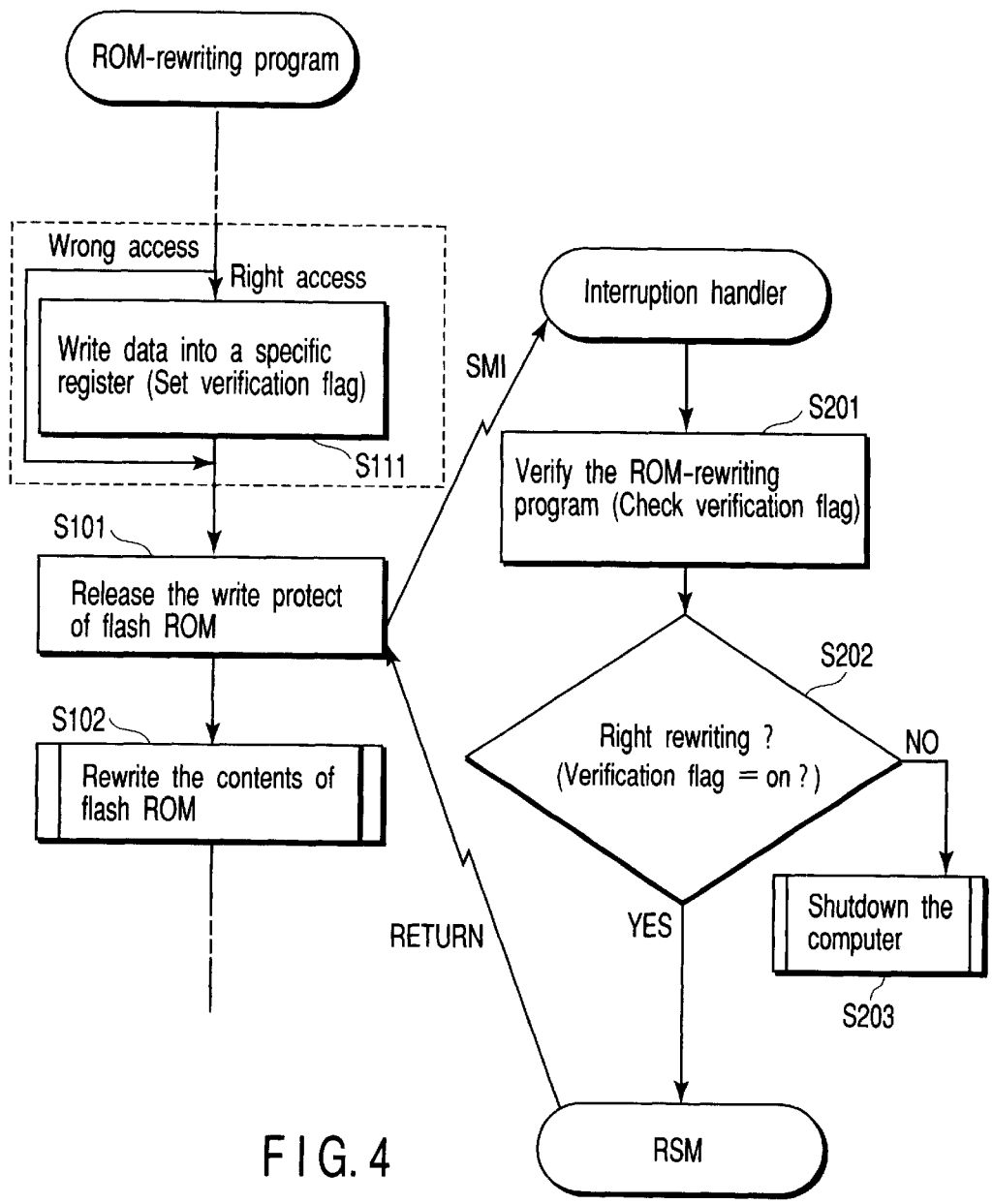
FIG. 4 is a flowchart illustrating still another method of rewriting the flash ROM incorporated in the system of FIG. 1.

A third procedure of rewriting the flash ROM will be described, with reference to the flowchart of FIG. 4. In the third procedure, any wrong rewriting of the flash BIOS-ROM 18 is prevented by shutting down the computer, not by setting the write protect again.

When the write protect is released, the SMI generator 153 generates an SMI signal. The SMI signal activates the interruption handler. The CPU 11 verifies the ROM-rewriting program (Step S201) and determines whether the access it has made by executing the ROM-rewriting program is a right one or not (Step S202), as in the second procedure of rewriting the flash ROM (FIG. 3). If the CPU 11 determines that the access is a right one, the interruption handler executes the resume (RSM) command. If the CPU 11 determines that the access is a wrong one, the interruption handler shutting down the computer (Step S203). Wrong rewriting of the flash BIOS-ROM 18 can no longer be performed.

An alarm may be generated to the user before the computer is shut down, requesting that the user select either the write protect or the shutdown for safety.

Prohibition of the Masking of SMI Signal

Figure 5:
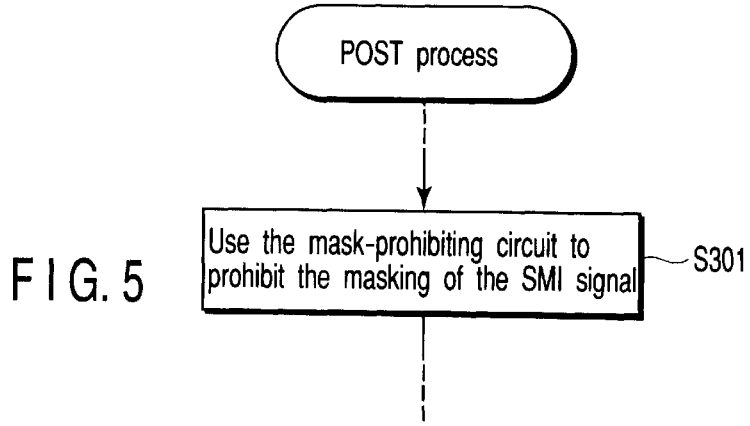
FIG. 5 is a flowchart explaining how a POST process is performed in the system of FIG. 1.
Figure 6:
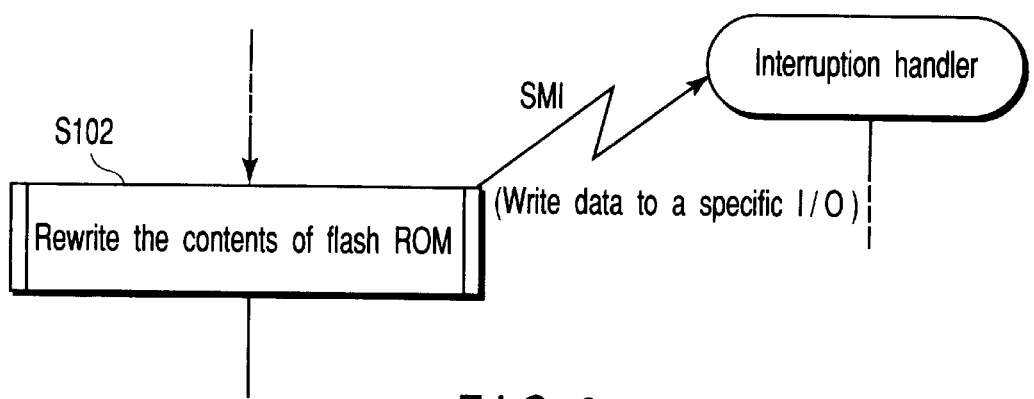
FIG. 6 is a flowchart illustrating how the interruption handler provided in the system of FIG. 1 is activated.

How the masking of the SMI signal is prohibited in the computer will be explained. As indicated above, the security functions are performed by the use of the SMI signal. If the SMI signal is blocked, or masked, it is no longer possible to perform the security functions. To perform the security functions reliably, the mask-prohibiting circuit 155 is controlled in the POST process described in the POST routine of the system BIOS. Thus controlled, the circuit 155 prohibits masking of the SMI signal (Step S301), as is illustrated in FIG. 5. The POST process is automatically carried out in accordance with the system BIOS when the computer is powered on. At the time of the computer is powered on, software, such as the OS and applications, have yet to be executed. Hence, the computer can acquire a high security level since the masking of the SMI signal is prohibited in the POST process.

Generation of SMI Signal

As described above, the SMI generator 153 generates an SMI signal when the write protect is released by using software. The SMI signal may be generated, not when the write protect is released, but when an I/O access is made to the flash ROM controller 151 for the first time after the write protect is released. To make the flash ROM controller 151 to erase the contents of the flash BIOS-ROM 18, software must be used to make an I/O access to the control register 152, so that a command may be given to the flash ROM controller 151. To this end, an I/O access made before erasing the contents of the flash BIOS-ROM 18 may trigger the SMI generator 153. Thus triggered, the SMI generator 153 generates an I/O trap SMI signal, which activates the interruption handler. Note that the I/O trap SMI signal is a signal the SMI generator 153 generates when the I/O access is intercepted.

Extended Function of the Interruption Handler

Figure 7:
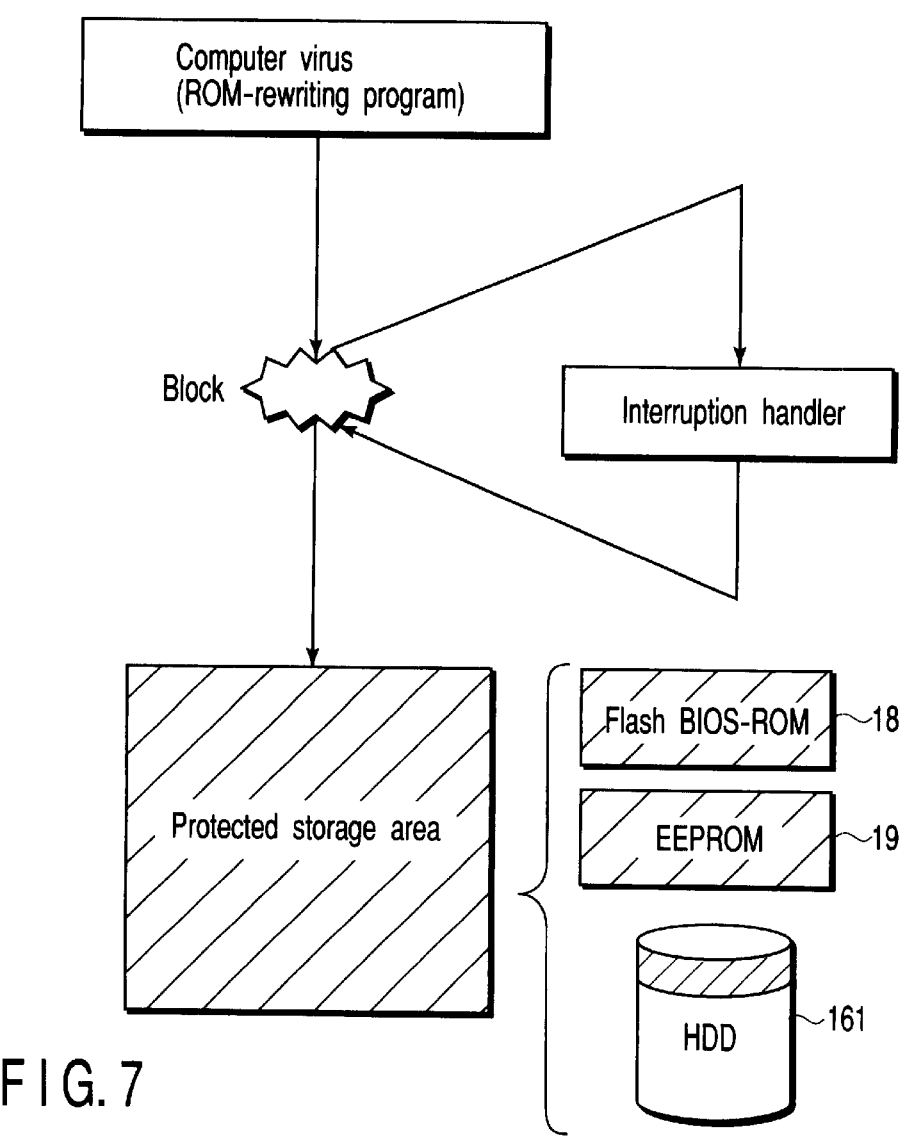
FIG. 7 is a diagram for explaining how the interruption handler is extended in terms of its function.

The control performed to prohibit wrong rewriting of the flash ROM has been described. In the computer according to the invention, wrong rewriting of important programs and data stored in the protected storage area, such as the EEPROM 19 or a specified area provided in the HDD 161, can be prohibited, too, as is illustrated in FIG. 7.

Computer virus may start a sequence of operations to rewrite the contents of the protected storage area. When the virus starts the sequence, a hardware interruption signal such as an SMI signal is generated in response to a hardware access for rewriting the contents of the protected storage area. The hardware interruption signal activates the interruption handler, whereby the CPU 11 determines whether the hardware access is a wrong one, due to the program authentication. If the hardware access is a wrong one, the interruption handler prohibits the rewriting of the contents of the protected storage area by shutting down the computer or setting the write protection.

In the embodiment described above, a hardware interruption signal is supplied to the CPU 11 when software makes an access to the ROM-rewriting hardware. Hence, the security functions can be performed at appropriate time. The computer can therefore acquire a high security level. The hardware interruption signal that the SMI generator 153 generates is not limited to the SMI signal exemplified above. Any other hardware interruption signal may be used to activate the interruption handler. Moreover, the interruption handler may be replaced by any utility that operates on the OS to verify the ROM-rewriting program.

As has been described, the present invention can provide a data-processing apparatus which has a nonvolatile storage device and in which software is prohibited from performing wrong rewriting of the nonvolatile storage device. The data-processing apparatus can therefore acquire a high security level.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data-processing apparatus comprising:
   a nonvolatile storage device;
   a controller configured to rewrite the contents of the nonvolatile storage device;
   means for accessing the controller to rewrite the contents of the nonvolatile storage device;
   means for determining whether a rewriting program is authorized to rewrite the contents of the nonvolatile storage device; and
   means for prohibiting the controller from rewriting the contents of the nonvolatile storage device when the determining means determines that the rewriting program is not authorized to rewrite the contents of the nonvolatile storage device.

2. The apparatus according to claim 1, wherein the determining means determines whether a procedure to be performed before the access to the controller has been performed by the accessing means, in order to determine that the rewriting program is authorized to rewrite the contents of the nonvolatile storage device.

3. The apparatus according to claim 2, wherein the procedure includes a procedure for setting a flag to an I/O register.

4. The apparatus according to claim 1, further comprising a CPU; and an interruption signal generator configured to generate an interruption signal to the CPU when the accessing means accesses the controller, wherein the determining means is activated by the CPU when the CPU receives the interruption signal.

5. The apparatus according to claim 4, further comprising a signal-masking prohibiting circuit that prohibits masking of the interruption signal.

6. The apparatus according to claim 4, wherein the controller has a write-protecting function for protecting the contents of the nonvolatile storage device from accidental rewriting, and the interruption signal generator generates the interruption signal, when the accessing means makes an access to the controller to release the write-protecting function of the controller.

7. The apparatus according to claim 6, wherein the prohibiting means includes means for returning the write-protecting function to active state when the determining means determines that the access made by the accessing means is a not right one, in order to prohibit the rewriting of the contents of the nonvolatile storage device.

8. The apparatus according to claim 1, wherein the prohibiting means includes means for shutting down the data-processing apparatus when the determining means determines that the access made by the accessing means is a not right one, in order to prohibit the rewriting of the contents of the nonvolatile storage device.

9. The apparatus according to claim 1, wherein the nonvolatile storage device stores an BIOS program.

10. A data-processing apparatus comprising:
    a nonvolatile storage device;
    a controller configured to rewrite the contents of the nonvolatile storage device;
    means for accessing the controller to rewrite the contents of the nonvolatile storage device;
    means for generating an interruption signal when the accessing means accesses the controller; and
    a CPU configured to perform an interruption process upon receipt of the interruption signal, determines, in the interruption process, whether the access made by the accessing means is a right one or not, and prohibits the controller from rewriting the contents of the nonvolatile storage device when the access made by the accessing means is a not right one.

11. The apparatus according to claim 10, wherein the controller has a write-protecting function for protecting the contents of the nonvolatile storage device from accidental rewriting, and the interruption signal generating means generates the interruption signal, when the accessing means makes an access to the controller to release the write-protecting function of the controller.

12. The apparatus according to claim 11, wherein the CPU returns the write-protecting function to active state when the access made by the access means is a not right one, in order to prohibit the rewriting of the contents of the nonvolatile storage device.

13. The apparatus according to claim 10, wherein the CPU shuts down the data-processing apparatus when the access made by the access means is a not right one, in order to prohibit the rewriting of the contents of the nonvolatile storage device.

14. The apparatus according to claim 10, wherein the interruption signal is one that switches an operating mode of the CPU, from an ordinary mode to a system management mode, and the CPU performs the interruption process in the system management mode.

15. A method of rewriting the contents of a nonvolatile storage device provided in a data-processing apparatus, said method comprising:
    generating an interruption signal to a CPU provided in the apparatus, when software executed by the CPU makes an access to a controller provided in the apparatus to rewrite the contents of the nonvolatile storage device;
    determining whether the access made by the software is a right one or not, during an interruption process that the CPU performs in response to the interruption signal; and
    prohibiting rewriting of the contents of the nonvolatile storage device when the access made by the software is a not right one, and allowing rewriting of the contents of the nonvolatile storage device when the access made by the software is an right one.

16. The method according to claim 15, wherein the determining includes determining whether a procedure to be performed before the access to the controller has been performed by the software, in order to determine whether the access made by the software is a right one or not.

17. The method according to claim 15, wherein the controller has a write-protecting function for protecting the contents of the nonvolatile storage device from accidental rewriting, and the generating includes generating the interruption signal when the software makes an access to the controller to release the write-protecting function of the controller.

18. The method according to claim 17, wherein the prohibiting includes returning the write-protecting function to active state when the access made by the software is a not right one, in order to prohibit the rewriting of the contents of the nonvolatile storage device.

19. The method according to claim 15, wherein the prohibiting includes shutting down the data-processing apparatus when the access made by the software is a not right one, in order to prohibit the rewriting of the contents of the nonvolatile storage device.

20. A data-processing apparatus comprising:
    a nonvolatile storage device;

a CPU;

a controller configured to rewrite contents of the nonvolatile storage device, having a write-protecting function for protecting the contents of the nonvolatile storage device from accidental rewriting;

means for accessing the controller to rewrite the contents of the nonvolatile storage device;

an interruption signal generator configured to generate an interruption signal to the CPU, when the accessing means makes an access to the controller to release the write-protecting function of the controller;

means for determining whether the access made by the accessing means is a right one or not, wherein the determining means is activated by the CPU when the CPU receives the interruption signal; and means for prohibiting the controller from rewriting the contents of the nonvolatile storage device when the determining means has determined that the access made by the accessing means is not a right one.

21. The apparatus according to claim 20, wherein the determining means determines whether a procedure to be performed before the access to the controller has been performed by the accessing means, in order to determine whether the access made by the accessing means is a right one or not.

22. The apparatus according to claim 20, wherein the prohibiting means includes means for returning the write-protecting function to an active state when the determining means has determined that the access made by the accessing means is not a right one, in order to prohibit the rewriting of the contents of the nonvolatile storage device.

23. The apparatus according to claim 20, wherein the prohibiting means includes means for shutting down the data-processing apparatus when the determining means has determined that the access made by the accessing means is not a right one, in order to prohibit the rewriting of the contents of the nonvolatile storage device.

24. A data-processing apparatus comprising:

a nonvolatile storage device;

a controller configured to rewrite the contents of the nonvolatile storage device, having a write-protecting function for protecting the contents of the nonvolatile storage device from accidental rewriting;

means for accessing the controller to rewrite the contents of the nonvolatile storage device;

means for generating an interruption signal when the accessing means accesses the controller to release the write-protecting function of the controller; and a CPU configured to perform an interruption process upon receipt of the interruption signal, determines, in the interruption process, whether the access made by the accessing means is a right one or not, and prohibits the controller from rewriting the contents of the nonvolatile storage device when the access made by the accessing means is not a right one.

25. A method of rewriting contents of a nonvolatile storage device provided in a data-processing apparatus, said method comprising:

generating an interruption signal to a CPU provided in the apparatus, when software executed by the CPU makes an access to a controller provided in the apparatus to release a write-protecting function for protecting the contents of the nonvolatile storage device from accidental rewriting;

determining whether the access made by the software is a right one or not, during an interruption process that the CPU performs in response to the interruption signal; and prohibiting rewriting of the contents of the nonvolatile storage device when the access made by the software is not a right one, and allowing rewriting of the contents of the nonvolatile storage device when the access made by the software is a right one.

26. The method according to claim 25, wherein the determining includes determining whether a procedure to be performed before the access to the controller has been performed by the software, in order to determine whether the access made by the software is a right one or not.

27. The method according to claim 25, wherein the prohibiting includes returning the write-protecting function to an active state when the access made by the software is not a right one, in order to prohibit the rewriting of the contents of the nonvolatile storage device.

28. The method according to claim 25, wherein the prohibiting includes shutting down the data-processing apparatus when the access made by the software is not a right one, in order to prohibit the rewriting of the contents of the nonvolatile storage device.

* * * * *

UNITED STATES PATENT AND TRADEMARK OFFICE
CERTIFICATE OF CORRECTION

PATENT NO. : 6,651,150 B2
DATED : November 18, 2003
INVENTOR(S) : Maeda

It is certified that error appears in the above-identified patent and that said Letters Patent is hereby corrected as shown below:

<u>Column 9,</u>
Line 57, change "an BIOS" to -- a BIOS --.

<u>Column 10,</u>
Line 43, change "an right" to -- a right --

Signed and Sealed this

Tenth Day of February, 2004

JON W. DUDAS
*Acting Director of the United States Patent and Trademark Office*